United States Patent
Sugahara

(10) Patent No.: US 7,123,368 B2
(45) Date of Patent: Oct. 17, 2006

(54) PRINT OBJECT CONVERTER, PRINT OBJECT CONVERSION METHOD, AND COMPUTER-READABLE RECORDING MEDIUM FOR RECORDING PROGRAMS RELATING TO PRINT OBJECT CONVERSION METHOD

(75) Inventor: Yoshinori Sugahara, Kyoto (JP)

(73) Assignee: Minolta Co., Ltd., Osaka (JP)

(*) Notice: Subject to any disclaimer, the term of this patent is extended or adjusted under 35 U.S.C. 154(b) by 850 days.

(21) Appl. No.: 09/931,249

(22) Filed: Aug. 17, 2001

(65) Prior Publication Data
US 2002/0046225 A1 Apr. 18, 2002

(30) Foreign Application Priority Data
Aug. 29, 2000 (JP) .............................. 2000-259005

(51) Int. Cl.
*G06F 3/12* (2006.01)
(52) U.S. Cl. ..................................... 358/1.13; 358/1.15
(58) Field of Classification Search .............. 358/1.15, 358/1.16, 1.13
See application file for complete search history.

(56) References Cited

U.S. PATENT DOCUMENTS

| | | | | |
|---|---|---|---|---|
| 5,228,118 A | * | 7/1993 | Sasaki | 358/1.13 |
| 5,737,501 A | * | 4/1998 | Tsunekawa | 358/1.2 |
| 5,859,954 A | * | 1/1999 | Toda | 358/1.2 |
| 5,926,185 A | * | 7/1999 | Vyncke et al. | 345/619 |
| 6,132,116 A | | 10/2000 | Yoshikawa | |
| 6,249,835 B1 | * | 6/2001 | Isoda | 710/100 |
| 6,690,478 B1 | * | 2/2004 | McIntyre | 358/1.13 |
| 6,801,330 B1 | * | 10/2004 | Klosterman et al. | 358/1.13 |

FOREIGN PATENT DOCUMENTS

| | | |
|---|---|---|
| JP | 10-336438 | 12/1998 |
| JP | 11-024863 | 1/1999 |

* cited by examiner

Primary Examiner—Dov Popovici
(74) Attorney, Agent, or Firm—Buchanan Ingersoll & Rooney PC

(57) ABSTRACT

When the print object conversion method is realized as a printer driver, first, a print object print request is received from an application. Then, intermediate data are generated from the print object and an object classification table is generated from the print object in parallel with the execution of generating intermediate data. Next, the object classification table and operating environment of the computer are compared to a PDL decision table prepared beforehand, and a single PDL is selected from among a plurality of PDLs. In PDL data generation, PDL data described in the selected PDL are generated from the intermediate data. The generated PDL data are output to the printer.

12 Claims, 3 Drawing Sheets

PRINT OBJECT CONVERTER, PRINT OBJECT CONVERSION METHOD, AND COMPUTER-READABLE RECORDING MEDIUM FOR RECORDING PROGRAMS RELATING TO PRINT OBJECT CONVERSION METHOD

CROSS-REFERENCE TO RELATED INVENTION

This application is based on Patent Application No. 2000-259005 filed in Japan, the contents of which are hereby incorporated by reference.

BACKGROUND OF THE INVENTION

1. Field of the Invention

The present invention relates to print controls for converting a print object to PDL data, and outputting PDL data to a printer.

2. Description of the Related Art

Print objects print requested from application software in a computer system normally are printed by a printer through a print program referred to as a printer driver which controls the printer. This type of use of a printer driver increases the load on the printer since the print object is send directly to the printer and printed. In this printer driver, first, intermediate data are generated from the print object. Then, PDL data described in page description language (PDL) are generated to specify the print image, and the PDL data are output to the printer. In the printer, the PDL data are converted to bitmap data and printed.

There is prior art for determining a mode for converting original image information from intermediate data (Japanese Laid-Open Patent No. H10-336438). This art generates an index from the intermediate data, determines an image processing mode considering image quality, and converts image information to image information suited to the image processing mode provided in the printer. However, this art suitably adjusts the resolution and number of tones of the image information in accordance with the performance of the printer, so as to maintain the image quality as much as possible.

There is prior art related to expansion processing from PDL data (Japanese Laid-Open Patent No. H11-24863). This art generates a bitmap image based on intermediate data, divides the bitmap image into a plurality of band regions and stores the bands in memory, and reduces the expansion processing load on the band memory based on the intermediate data by determining the number of lines expanded across each band region. However, this art is a method for processing bitmap data of expanded PDL data in band memory, and reduces the load of expansion processing from the PDL data.

Considerable time is required to print a print object requested from an application, and increasing speed is sought. One factor taking time when printing a print object is the enormous amount of data of the print object provided to improve the resolution of the printer. Furthermore, another factor is the proliferation of printers coping with a plurality of PDL. When printing using such printers, a PDL must be selected from among a plurality of PDLs to generate the PDL data. Conventionally, the user doing the printing selects the PDL, and the PDL is selected on the application side. However, when a PDL other than a specific PDL is selected depending on the print object, extra time may be required for the PDL data generation time and printing time of the printer. Furthermore, the PDL preparation time may change depending on the operating environment of the computer generating the PDL data. For this reason reducing the print time and selection of optimum PDL from among a plurality of PDLs is sought.

OBJECTS AND SUMMARY

An object of the present invention is to provide a printer driver which shortens printing time.

A first aspect is a print object converter comprising an intermediate data generator for generating intermediate data of a print object to be printed, a classification table generator for generating an object classification table of the print object in parallel with the generation of the intermediate data, a recording device for saving the intermediate data and the object classification table, a PDL selector for selecting one PDL from among a plurality of PDLs using the object classification table, a PDL data generator for generating PDL data from the intermediate data in the selected PDL, and an output device for outputting the PDL data to a printer.

A second aspect is a print object conversion method comprising a step of generating intermediate data of a print object to be printed, a step of generating an object classification table of the print object in parallel with the generation of the intermediate data, an step of saving the intermediate data and the object classification table to a recording device, a step of selecting one PDL from among a plurality of PDLs using the object classification table, a step of generating PDL data from the intermediate data in the selected PDL, and a step of outputting the PDL data to a printer.

A third aspect is a computer-readable recording medium for storing programs used by the computer to execute print object conversion, the program comprising a step of generating intermediate data of a print object to be printed, a step of generating an object classification table of the print object in parallel with the generation of the intermediate data, an step of saving the intermediate data and the object classification table to a recording device, a step of selecting one PDL from among a plurality of PDLs using the object classification table, a step of generating PDL data from the intermediate data in the selected PDL, and a step of outputting the PDL data to a printer.

These and other objects, features and advantages of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The embodiments of the present invention are described hereinafter with reference to the accompanying drawings.

Figure 1:
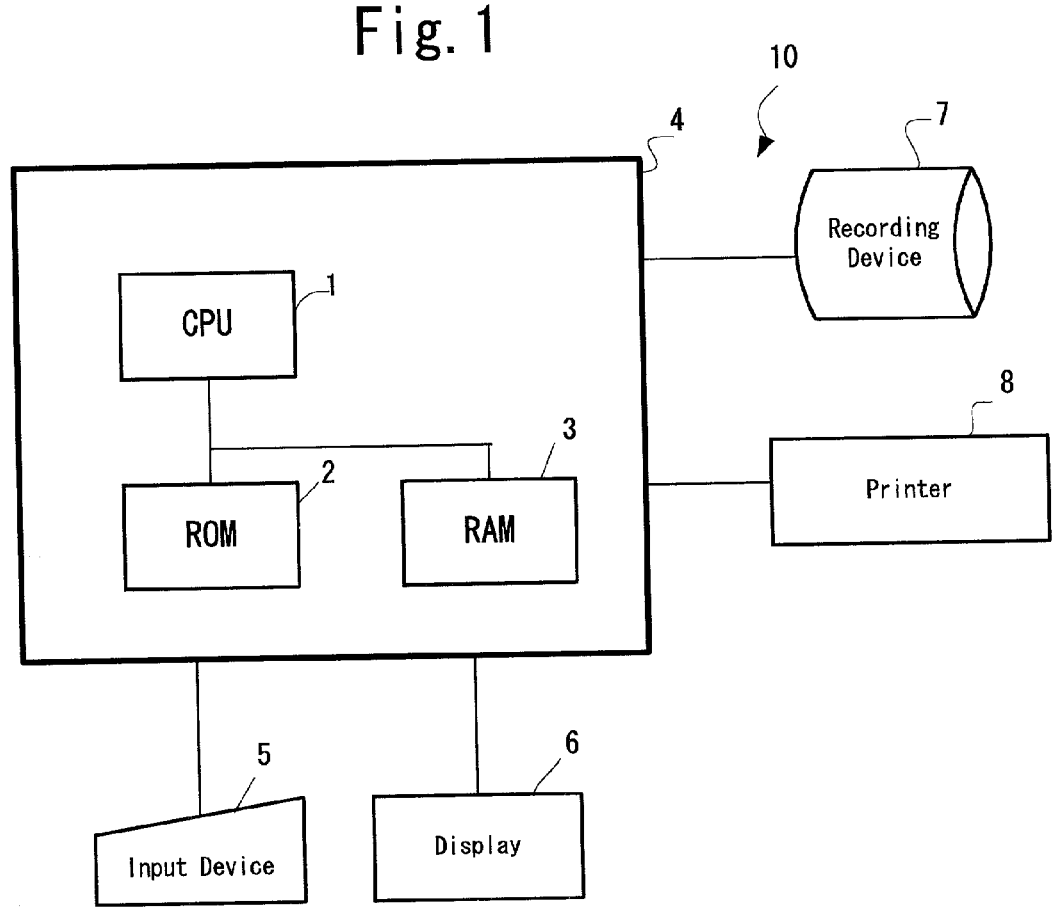
FIG. 1 briefly shows a printing system.

FIG. 1 briefly shows a printing system 10. In the printing system 10 are an input device 5, display device 6, recording device 7, and printer 8 all connected to a computer 4. The computer 4 comprises a CPU 1, ROM 2, and RAM 3 connected to the CPU 1. Application software are normally read to RAM 3 from ROM 2 or the recording device 7. When a print object print request is issued from an application, the data related to the print object are subjected to a conversion process, and the data described in page description language (PDL) are transmitted from CPU 1 to the printer 8 as print data. In the printer 8, printing is executed based on the received print data. The recording device 7 may be a floppy disk, hard disk, optical disk, opto-magnetic disk, or non-volatile semiconductor recording device. The input device 5 may be, for example, a keyboard, pointing device and the like. The display device 6 may be, for example, a CRT, liquid crystal display and the like.

The page description language (PDL) may be, for example, postscript (trademark), PCL (trademark), LIPS (trademark), interpress (trademark), or other type of PDL. The printer 8 responds to a plurality of page description language (PDL), and expands input PDL data and bitmap data for printing.

The printer 8 may be, for example, a laser printer or the like. The printer 8 is not limited to a laser printer insofar as the printer used is capable of printing PDL data.

Figure 2:
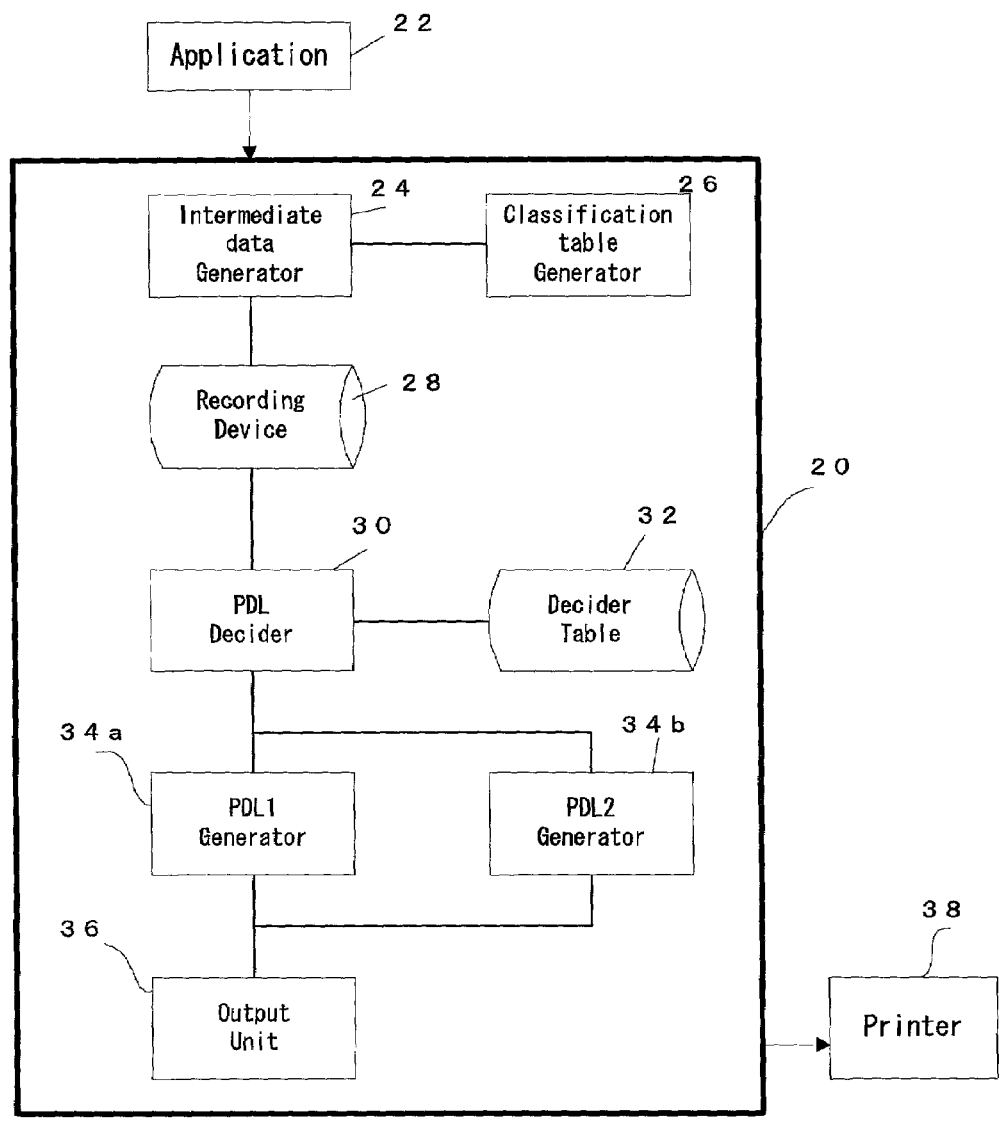
FIG. 2 briefly shows the print object conversion process in a print object converter of an embodiment of the present invention.

FIG. 2 is a function block diagram describing a print object conversion processor 20 in a print object converter. The print object conversion processor 20 comprises an intermediate data 24 generator 24, classification table generator 26, recording device 28, PDL decider 30, Decider table (PDL decision table) 32, PDL generators 34*a* and 34*b*, and output unit 36.

The operation of the print object conversion processor 20 is described below. First, the print object conversion processor 20 receives data from an application 22 related to a print object to be printed. Then, the intermediate data generator 24 generates intermediate data of the print object from the received data. An example if the intermediate data is shown in Table 1.

TABLE 1

| Text Line | | Object 1 |
|---|---|---|
| Position | (10,10) | |
| Character code | "ABC" | |
| Font | Arial | |
| Size | (40,20) | |
| Square | | Object 2 |
| Start position | (10,10) | |
| End position | (90,40) | |
| Line width | 1 | |

Then, In the classification table generator 26, an object classification table is generated from the print object in parallel with the generation of intermediate data in the intermediate data generator 24. The object classification table includes, for example, at leas one among items of number of text lines, number of bitmap data, number of arcs, number of squares, number of straight lines, number of curves. Items of the object classification table are not limited to the aforesaid items. An example of an object classification table is shown in Table 2.

TABLE 2

| Print object type | Number |
|---|---|
| Text line | 50 |
| Bitmap | 2 |
| Arc | 100 |
| Square | 1000 |
| Straight line | 50 |
| Curve | 5 |

The generated intermediate data and object classification table are saved, for example, on recording device 28.

Then, the PDL decider 30 compares the object classification table and computer operating environment to a PDL decision table 32 prepared beforehand, and selects one PDL from among a plurality of PDLs. First, the PDL decider 30 acquires the computer operating environment and object classification table saved on recording device 28. An example of a computer operating environment is shown in Table 3.

TABLE 3

| Operating environment | Performance |
|---|---|
| CPU clock speed (MHz) | 300 |
| Memory capacity (MB) | 124 |
| Connection IF | LPT |
| Printer type | B-type printer |

An example of a PDL decision table 32 is shown Table 4.

TABLE 4

| No. | Text lines | Bitmap data | Arcs | Curves | CPU clock speed (MHz) | Installed memory | Connection interface | Printer type | PDL type |
|---|---|---|---|---|---|---|---|---|---|
| 1 | <100 | Non-target | <50 | <10 | <400 | <64 | USB | A | PDL1 |
| 2 | <100 | Non-target | <50 | <10 | <400 | <64 | USB | B | PDL1 |
| 3 | <100 | Non-target | <50 | <10 | <400 | <64 | LPT | A | PDL1 |
| 4 | <100 | Non-target | <50 | <10 | <400 | <64 | LPT | B | PDL2 |
| 5 | <100 | Non-target | <50 | <10 | <400 | ≧64 | USB | A | PDL1 |
| 6 | <100 | Non-target | <50 | <10 | <400 | ≧64 | USB | B | PDL2 |

TABLE 4-continued

| No. | Text lines | Bitmap data | Arcs | Curves | CPU clock speed (MHz) | Installed memory | Connection interface | Printer type | PDL type |
|---|---|---|---|---|---|---|---|---|---|
| 7 | >100 | Non-target | <50 | <10 | <400 | ≧64 | LPT | A | PDL1 |
| 8 | <100 | Non-target | <50 | <10 | <400 | ≧64 | LPT | B | PDL2 |
| 9 | <100 | Non-target | ≧50 | >10 | <400 | ≧64 | LPT | B | PDL1 |
| n | <100 | Non-target | ≧50 | <10 | <400 | ≧64 | LPT | B | PDL2 |
| N | ≧100 | Non-target | ≧50 | ≧10 | ≧400 | ≧64 | LPT | B | PDL2 |

In the example of Table 4, since the bitmap data number does not reference the PDL decision, it is listed as non-target. The device interface (IF) refers to either LPT (originally a line printer, but now the logical device name for a parallel port), or USB (universal serial bus). The printer type represents either printer type A or printer type B.

The PDL decision table of Table 4 is described below. The PDL decision table is a table of N lines in its entirety. Among the items of each row, the text line number and curve number correspond to the object classification table, and from the CPU clock speed to the printer type corresponds to the computer operating environment. The PDL type corresponding to the condition of each line is shown at the right end. In selecting a single PDL from among a plurality of PDLs, the PDL type at the right end is selected when the object classification table and operating environment conditions are valid for all conditions of any line. For example, when each condition of the object classification table of Table 2 and the computer operating environment of Table 3 match the conditions of line n in Table 4, PDL 2 is selected.

The items of each row of the PDL decision table may include at least one among items of number of text lines, number of bitmap data, number of arcs, number of squares, number of straight lines, number of curves as an item corresponding to the object classification table. It is desirable that items of each line of the PDL decision table include at least one among items of CPU clock speed, installed memory, type of connection interface, and type of printer corresponding to the computer operating environment. Furthermore, the PDL decision table is not limited to the format shown in Table 4, and may be a conditional branch type. The PDL decision table may be prepared and stored beforehand. The PDL decision table also may be generated anew for each change in connected printer or operating environment. The PDL decision table also may be stored on a memory device other than ROM and RAM.

Then, since the selected PDL is PDL 2, the PDL 2 generator 34b generates PDL data described in PDL 2 from the intermediate data.

Then, the output device 36 outputs the PDL data as print data to the printer 38.

Under this condition, printing speed is increased by greatly reducing the total time of the time for generating PDL data in the selected PDL 2 and the total time for printing by the printer 38.

The PDL decider 30 also may select a PDL by making a decision using only the object classification table, when the computer operating environment is not a decision factor.

In this case the printing time of the printer 38 is reduced.

The print object converter also may be provided in the computer 4 or printer 8 in the printing system 10 shown in FIG. 1, or may be provided in another device. The print object converter may be realized not only in hardware, but also in software.

Figure 3:
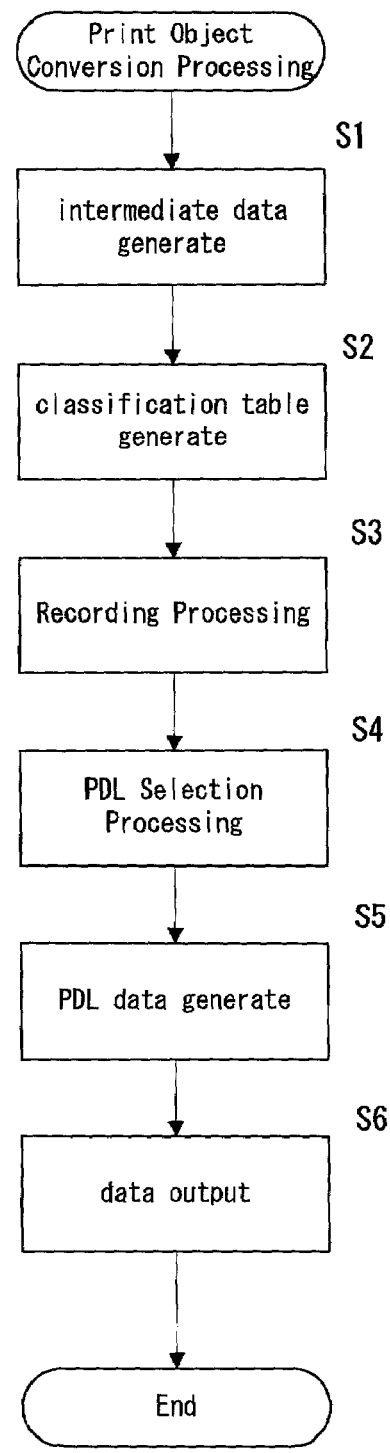
FIG. 3 is a flow chart showing the print object conversion process of an embodiment of the present invention.

FIG. 3 is a flow chart describing the print object conversion processing executed by the computer when the print object conversion method is realized as a printer driver. The print object conversion method is described via the flow chart of FIG. 3.

First, a print object print request is received from an application. The print request, for example, is executed by calling the print driver enter function directly from the application, or via the interface of the operating system OS. Then, intermediate data (refer to Table 1) are generated from the print object (step S1).

In the classification table of step S2, an object classification table (refer to Table 2) is generated from the print object. Step S2 is executed in parallel with the execution of step S1 for generating intermediate data.

In the recording process in step S3, the intermediate data generated in step S1, and the object classification table generated in step S2 are saved to a recording device. When the print object is a file format, the identifier and attributes are also saved to the recording device.

In the PDL selection process in step S4, the object classification table and operating environment of the computer are compared to a PDL decision table prepared beforehand, and a single PDL is selected from among a plurality of PDLs. First, the object classification table and computer operating environment saved on the recording device are acquired. In the PDL decision of step S4, a PDL type is selected which conforms to the conditions on the PDL decision table, however, the PDL type may be selected by a conditional branch format rather than a table format. When the print object conversion method is realized as a printer driver, the printer driver may be specified for each printer, or the printer driver may correspond to a plurality of printers.

In the PDL data generation of step S5, PDL data described in the PDL selected in step S4 are generated from the intermediate data generated in step S1.

In the data output in step S6, the PDL data generated in step S5 are output to the printer 8.

In the printer 8, the transmitted PDL data are subjected to an expansion process, converted to bitmap data, and the bitmap data are printed.

In the print object conversion method, an optimum PDL can be selected from a plurality of PDLs in the PDL decision of step S4. The PDL data generation time and the printer 8 printing time can be optimized so as to increase the printing speed by generating PDL data from intermediate data of the print object using the selected PDL. In other words, the load on the computer and the load on the printer 8 can be balanced to increase the printing speed.

Another mode of the present embodiment is a computer readable recording medium for recording programs for executing the print object conversion method by computer.

The program recorded on the recording medium is executed by computer to execute the print object recording method. The print object conversion method may be executed when a print request is received from an application, or the function may be realized by a program for executing the print object conversion method incorporated in the system beforehand. The execution format of the program for executing the print object conversion method incorporated in the system beforehand is that of a printer driver. It is desirable that the format executes printing and is incorporated in the system.

The recording medium for recording the program may be, for example, magnetic recording medium such as magnetic tape, flexible disk, hard disk or the like, optical disk such as CD-ROM, CD-R and the like, opto-magnetic disk, or semiconductor recording device such as ROM, EEPROM and the like.

In the computer-readable recording medium for recording programs related to the print object conversion method, an optimum PDL can be selected from among a plurality of PDLs by executing this program by computer. The PDL data generation time and the printer printing time can be optimized so as to increase the printing speed by generating PDL data from intermediate data of the print object using the selected PDL. In other words, the load on the computer and the load on the printer can be balanced to increase the printing speed.

As described above, the print object converter of the present invention selects an optimum PDL from among a plurality of PDLs in accordance with the print object classification and the computer operating environment. In this way the load on the computer and the load on the printer can be optimally balanced to increase the printing speed.

The print object conversion method of the present invention selects an optimum PDL from among a plurality of PDLs in accordance with the print object classification and the computer operating environment. In this way the load on the computer and the load on the printer can be optimally balanced to increase the printing speed.

The computer-readable recording medium for recording programs related to the print object conversion method of the present invention selects an optimum PDL from among a plurality of PDLs in accordance with the print object classification and the computer operating environment by executing the program related to the print object conversion process by computer. In this way the load on the computer and the load on the printer can be optimally balanced to increase the printing speed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A print object converter comprising:
   an intermediate data generator for generating intermediate data of a print object to be printed;
   a classification table generator for generating an object classification table of the print object in parallel with the generation of the intermediate data;
   a recording device for saving the intermediate data and the object classification table;
   a PDL selector for selecting one PDL from among a plurality of PDLs using the object classification table;
   a PDL data generator responsive to said PDL selector for generating PDL data from the intermediate data in the selected PDL; and
   an output device for outputting the PDL data in said selected PDL to a printer.

2. A print object converter as claimed in claim 1, wherein said PDL selector compares the object classification table and a PDL decision table, and selects a PDL.

3. A print object converter as claimed in claim 1, wherein said PDL selector selects one PDL from among a plurality of PDLs depending on the operating environment of the computer.

4. A print object conversion method comprising the steps of:
   generating intermediate data of a print object to be printed;
   generating an object classification table of the print object in parallel with the generation of the intermediate data;
   saving the intermediate data and the object classification table to a recording device;
   selecting one PDL from among a plurality of PDLs using the object classification table;
   generating PDL data from the intermediate data in the selected PDL; and
   outputting the PDL data to a printer.

5. A print object conversion method as claimed in claim 4, wherein said step of selecting a PDL compares the object classification table and a PDL decision table, and selects a PDL.

6. A print object conversion method as claimed in claim 4, wherein said step of selecting a PDL selects one PDL from among a plurality of PDLs depending on the operating environment of the computer.

7. A computer-readable recording medium for storing programs used by the computer to execute print object conversion, the program comprising the steps of:
   generating intermediate data of a print object to be printed;
   generating an object classification table of the print object in parallel with the generation of the intermediate data;
   saving the intermediate data and the object classification table to a recording device;
   selecting one PDL from among a plurality of PDLs using the object classification table;
   generating PDL data from the intermediate data in the selected PDL; and
   outputting the PDL data to a printer.

8. A computer-readable recording medium as claimed in claim 7, wherein the step of selecting a PDL compares the object classification table and a PDL decision table, and selects a PDL.

9. A computer-readable recording medium as claimed in claim 8, wherein said PDL decision table includes at least one among items of number of text lines, number of bitmap data, number of arcs, number of squares, number of straight lines, number of curves.

10. A computer-readable recording medium as claimed in claim 7, wherein said object classification table includes at least one among items of number of text lines, number of bitmap data, number of arcs, number of squares, number of straight lines, number of curves.

11. A computer-readable recording medium as claimed in claim 7, wherein the step of selecting a PDL selects one PDL from among a plurality of PDLs depending on the operating environment of the computer.

12. A computer-readable recording medium as claimed in claim 11, wherein said operating environment includes at least one among items of number of CPU cycles, installed memory, type of connection interface, type of printer.

* * * * *